(12) United States Patent
Sandman et al.

(10) Patent No.: US 10,012,333 B2
(45) Date of Patent: Jul. 3, 2018

(54) FLUID CONDITIONING DEVICES AND ASSEMBLIES

(75) Inventors: Joseph P. Sandman, Morrow, OH (US); Michael N. Sandman, Morrow, OH (US)

(73) Assignee: Langdon Incorporated, Cincinnati, OH (US)

( * ) Notice: Subject to any disclaimer, the term of this patent is extended or adjusted under 35 U.S.C. 154(b) by 954 days.

(21) Appl. No.: 13/489,843

(22) Filed: Jun. 6, 2012

(65) Prior Publication Data

US 2013/0331022 A1 Dec. 12, 2013

(51) Int. Cl.
| | |
|---|---|
| F16L 23/00 | (2006.01) |
| F16L 21/00 | (2006.01) |
| F16L 21/035 | (2006.01) |
| F16L 23/06 | (2006.01) |
| F16L 25/08 | (2006.01) |
| F16L 25/14 | (2006.01) |
| F24F 13/02 | (2006.01) |

(52) U.S. Cl.
CPC .......... *F16L 21/002* (2013.01); *F16L 21/035* (2013.01); *F16L 23/06* (2013.01); *F16L 25/08* (2013.01); *F16L 25/14* (2013.01); *F24F 13/0209* (2013.01); *F24F 13/0272* (2013.01); *F24F 2221/22* (2013.01)

(58) Field of Classification Search
CPC ....... F16L 21/002; F16L 21/035; F16L 23/00; F16L 23/06; F16L 25/08; F16L 25/14; F24F 13/0209; F24F 13/0272; F24F 13/029; F24F 2221/22; F24F 2221/36
USPC ....... 454/233, 241, 251, 322, 330, 333, 363, 454/370; 285/33, 363, 364, 405, 406
See application file for complete search history.

(56) References Cited

U.S. PATENT DOCUMENTS

| | | | | |
|---|---|---|---|---|
| 3,520,563 | A * | 7/1970 | Decker, Jr. ...................... | 285/87 |
| 4,655,481 | A * | 4/1987 | Prueter ................. | F16L 23/003 |
| | | | | 285/24 |
| 5,909,904 | A * | 6/1999 | Shea ............................ | 285/405 |
| 6,835,128 | B1 * | 12/2004 | Olson .......................... | 454/232 |
| 7,350,834 | B2 * | 4/2008 | Ryhman ................. | F16L 23/04 |
| | | | | 285/406 |

(Continued)

OTHER PUBLICATIONS

Price Industries, HVAC Catalog, Air Control Valves, Section F, obtained May 17, 2012 at http://www.price-hvac.com/catalog/section_f/Air_Control_Valve/Healthcare and Laboratories/VVA.aspx.

(Continued)

*Primary Examiner* — Gregory Huson
*Assistant Examiner* — Dana Tighe
(74) *Attorney, Agent, or Firm* — Wood Herron & Evans LLP

(57) ABSTRACT

A fluid conditioning assembly includes a fluid conditioning device defining a passage and having a first end and a second end. A control element is supported within the passage. At least the first end includes an integral radially outwardly directed flange. The integral radially outwardly directed flange is configured to be operatively and releasably coupled to a first radially outwardly directed flange of a first duct section. A technician may release the fluid conditioning device from the first duct section to remove the fluid conditioning device from the ventilation duct system for accessing the control element of the fluid conditioning device.

20 Claims, 12 Drawing Sheets

(56) References Cited

U.S. PATENT DOCUMENTS

| | | |
|---|---|---|
| 7,523,964 B2 | 4/2009 | Sandman et al. |
| 7,997,112 B2 | 8/2011 | Sandman et al. |
| 2007/0234568 A1* | 10/2007 | Knoblauch ............... 29/890.14 |
| 2009/0083962 A1 | 4/2009 | Sandman et al. |
| 2009/0266903 A1* | 10/2009 | Fitzgerald et al. .......... 236/49.3 |
| 2010/0038902 A1 | 2/2010 | Sandman et al. |

OTHER PUBLICATIONS

Phoenix Controls, Drawband Clamps, 2003 (Rev. Jun. 2011), pp. 1-3.
Triatek, LLC., Installation Procedures diagram.

* cited by examiner

FLUID CONDITIONING DEVICES AND ASSEMBLIES

FIELD OF THE INVENTION

The present invention relates generally to ventilation duct systems and, more particularly, to a removable fluid conditioning assembly for a ventilation duct system to provide access to a fluid conditioning device within the fluid conditioning assembly.

BACKGROUND OF THE INVENTION

In ventilation duct systems, there are oftentimes a variety of components connected to the duct system that must be periodically inspected, maintained, and repaired. Due to their internal construction, however, these components are typically not easily accessible for routine inspection, maintenance, and repair.

Internal components include those that condition the flow of fluid within the ductwork. These devices may include inline fans, manual or automatic dampers, or venturi air devices to name only a few. Normally these types of devices are assembled within a housing or enclosure and are inserted into the duct system so that the duct slides over a section of the housing. To prevent ingress of exterior gasses or egress of the fluid from the duct, a sealer may be used at each joint between the ductwork and the device housing. Typically, the sealer is in fluid-like form and is distributed between a surface of the duct and a surface of the device. Once the sealer is distributed, it may cure to a solid-like, pliable form to provide a fluid-tight seal.

This type of installation makes removal of the device from the ductwork difficult or impossible without significant expenditure of effort to disassemble each joint to free the device from the ductwork. Furthermore, this type of disassembly may result in damage to the adjacent ductwork and/or damage to the device itself thus necessitating repair of the duct and/or replacement of the device. Oftentimes, as a result, inspection, maintenance, and repair operations become costly endeavors because of the effort required and potential damage associated with the removal of the device.

Attempts to address the costs associated with removal of these devices for inspection, maintenance, and repair operations have been generally unsuccessful. In this regard, the devices have been made available with a flanged housing or enclosure. The premise is that a flanged enclosure, when bolted to a mating flange on adjacent ductwork, may be more easily disassembled by unbolting the flanges and removing the device from between adjacent ductwork. Generally, the flanges used are separate annular rings of metal that are typically welded to the housing at each end. The weld seam is therefore between the annular ring and the housing and is generally externally positioned to be between the adjacent ductwork and the device. As such, the weld seam is typically exposed to the fluid flow through the ductwork.

However, a weld seam at this location is possibly problematic, particularly where air quality is paramount. For example, food processing facilities are acutely sensitive to the presence of bacteria in the facility and spare no expense to eradicate sources of potential repositories of bacteria. Because the ductwork is critical to cleanliness of the facility, weld joints in the ductwork are disfavored. More specifically, a weld seam by which a flange is attached to a device enclosure is exposed to the fluid flow within the ductwork. And, because of the generally rough nature of a raw or unfinished weld joint, the weld may harbor bacteria and, at the same time, resist cleaning efforts to keep the ductwork bacteria free. Furthermore, a weld is more likely to corrode, which may be another source of contamination for the fluid inside the ductwork. Thus, welding the flange to the device simply to allow ease of inspection, maintenance, or repair, is disfavored by industries that require high quality, substantially contaminant-free air.

Thus, there is a need for improved access to components internal to the ductwork, that overcomes these and other shortcomings and drawbacks of known components in ventilation duct systems.

SUMMARY OF THE INVENTION

The present invention overcomes the foregoing and other shortcomings and drawbacks of access to internal components heretofore known for use in ventilation duct systems. While the invention will be described in connection with certain embodiments, it will be understood that the invention is not limited to these embodiments. On the contrary, the invention includes all alternatives, modifications and equivalents as may be included within the spirit and scope of the present invention.

In accordance with the principles of the present invention, a fluid conditioning assembly is provided for use in a ventilation duct system including a first duct section and a second duct section. The first duct section has an end that is spaced apart from an end of the second duct section. At least one of the ends of the first duct section and the second duct section is provided with a first radially outwardly directed flange.

The fluid conditioning assembly includes a fluid conditioning device defining a passage therethrough and having a first end and a second end. The first end includes an integral radially outwardly directed flange. A control element is supported within the passage between the first end and the second end and is configured to condition the flow of fluid passing through the passage of the fluid conditioning device. The integral radially outwardly directed flange is configured to be operatively and releasably coupled to the first radially outwardly directed flange of the first duct section or the second duct section. A technician may release the fluid conditioning device from the first duct section to remove the fluid conditioning device from the ventilation duct system. Removing the fluid conditioning device from the ventilation duct system permits access to the control element supported within the passage of the fluid conditioning device.

According to one aspect of the present invention a first adapter is configured to be coupled to one of the first duct section and the second duct section. The first adapter defines a passage therethrough and has a first end and a second end. The first end includes the first radially outwardly directed flange and the second end is configured to be coupled to one of the ends of the first duct section and the second duct section.

According to other aspects of the present invention, the second end of the adapter is configured to abut one of the ends of the first duct section and the second duct section or to slidably engage one of the ends of the first duct section and the second duct section and be operatively coupled thereto.

According to other aspects of the present invention, the adapter includes a gasket configured to sealingly engage one of the first duct section or the second duct section when the adapter is operatively coupled thereto. Or, at least one of the first duct section and the second duct section includes a gasket proximate the end thereof, and the adapter is configured to sealing engage the gasket when the adapter is operatively coupled to one of the first duct section and the second duct section.

According to another aspect of the present invention, the second end of the fluid conditioning device has a second integral radially outwardly directed flange. And, the fluid conditioning assembly further includes a second adapter that is configured to be operatively coupled to the second duct section. The second adapter defines a passage therethrough and has a first end and a second end. The first end of the second adapter has a fourth radially outwardly directed flange that is configured to be operatively and releasably coupled to the second integral radially outwardly directed flange of the fluid conditioning device. A technician may release the fluid conditioning device from the first adapter and the second adapter to remove the fluid conditioning device from between the first and second duct sections.

According to another aspect of the present invention, a fluid conditioning device is selected from the group consisting of a venturi valve, a damper, and a fan.

According to another aspect of the present invention, there is a ventilation duct system that includes a first duct section having an end provided with a first radially outwardly directed flange, a second duct section spaced apart from the first duct section and having an end provided with a second radially outwardly directed flange. The ventilation duct system further includes a fluid conditioning assembly that operatively couples the end of the first duct section to the end of the second duct section.

The fluid conditioning assembly includes a fluid conditioning device defining a passage and having a first end and a second end. The first end and second end each include an integral radially outwardly directed flange. A control element is included in the passage and is configured to condition the flow of fluid between the first duct section and the second duct section. A first clamp releasably couples the first flange of the first duct section to one of the integral radially outwardly directed flanges, and a second clamp releasably couples the second flange of the second duct section to the other of the integral radially outwardly directed flanges. A technician may release the clamps to remove the fluid conditioning device relative to the first duct section and the second duct section.

The above and other objectives and advantages of the present invention shall be made apparent from the accompanying drawings and the description thereof.

BRIEF DESCRIPTION OF THE DRAWINGS

The accompanying drawings, which are incorporated in and constitute a part of this specification, illustrate an embodiment of the invention and, together with the general description of the invention given above and the detailed description of embodiments given below, serve to explain the principles of the present invention.

DETAILED DESCRIPTION OF THE INVENTION

Figure 1:
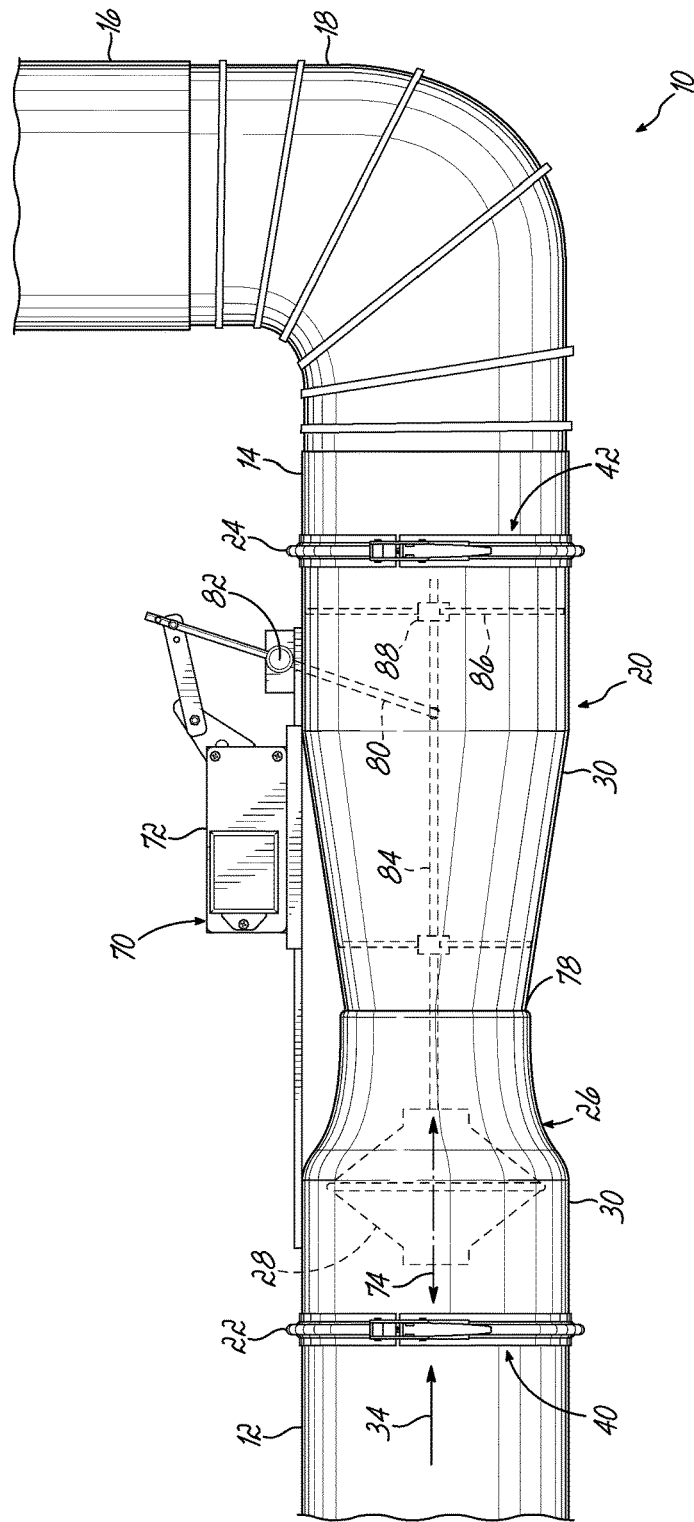
FIG. 1 is a hidden-line side elevational view of an exemplary ventilation duct system according to one embodiment of the present invention.

Referring now to the figures, and to FIG. 1 in particular, an exemplary ventilation duct system 10 is shown in accordance with the principles of the present invention. The duct system 10, according to one embodiment of the invention, is shown including various types of ductwork, such as, multiple ventilation duct sections 12, 14, and 16 with an elbow 18 coupling duct sections 14 and 16 together. In addition, according to embodiments of the present invention, a fluid conditioning assembly 20 operatively couples duct section 12 to duct section 14 to form the duct system 10. By way of example, the duct system 10 may be configured to direct the flow of a fluid, for example, air, to various parts of a building. For example, the duct system 10 may form one branch of a heating, ventilation, and air conditioning (HVAC) system in a building.

As is described in more detail below, the fluid conditioning assembly 20 may allow the flow of fluid through the duct system 10 to be conditioned or changed in some respect, for example, by changing one or both of the volume of fluid flow and the pressure of the fluid between the duct section 12 and the duct section 14. Fluid flow may include the flow of air, however, embodiments of the present invention are not limited to air flow, as a fluid may include other gas compositions and, possibly, even liquids. While the exemplary ventilation duct system 10 is shown including ductwork, such as, sections 12, 14, and 16; elbow 18; and fluid conditioning assembly 20, it will be appreciated that other types and configurations of duct components are also known to those of ordinary skill in the art and are also possible without departing from the spirit and scope of the present invention. For example, although not shown, the duct system 10 may include one or more sleeve couplings to couple adjacent duct sections together as well as one or more duct reducers to couple duct sections of different cross-sectional dimensions together.

As will be described in greater detail below, the fluid conditioning assembly 20 may be easily removed from and reinstalled in the duct system 10. To that end, and in the exemplary embodiment shown in FIGS. 1 and 2, the fluid conditioning assembly 20 may be operatively coupled to the duct section 12 with a clamp 22 at one end thereof, and the fluid conditioning assembly 20 may be operatively coupled to the duct section 14 with a clamp 24 at the other end thereof. The clamps 22, 24 may be easily removed to allow all or a portion of the fluid conditioning assembly 20 to be removed or disconnected from the duct system 10. Once removed, the internal components of the assembly 20 may be more easily accessed for inspection, maintenance, or repair as is described in more detail below.

Figure 3:
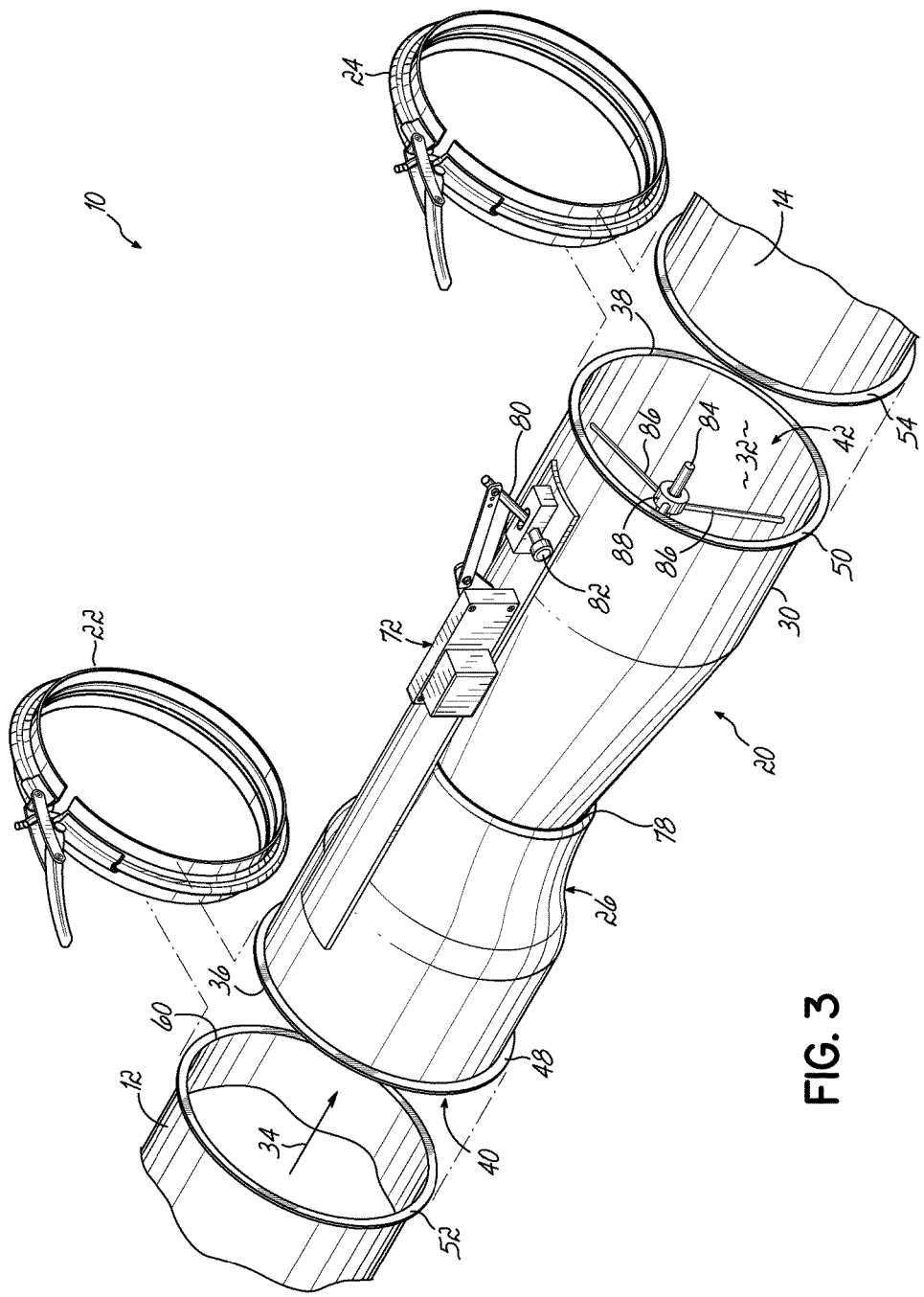
FIG. 3 is an exploded perspective view of the embodiment shown in FIG. 2.

In this regard, and with reference to FIGS. 1 and 3, the fluid conditioning assembly 20 may include a fluid conditioning device 26 having a control element 28 (see FIG. 1) to control and/or condition the flow of fluid within the duct system 10. The control element 28 may be surrounded or housed within a sidewall 30 which defines a passage 32. The passage 32 directs a flow of fluid, indicated by arrow 34 in FIGS. 1 and 3, through the fluid conditioning device 26. The sidewall 30 defines opposing ends 36 and 38 of the fluid conditioning device 26. The passage 32 may be in direct contact with the fluid flow from the duct section 12. However, the fluid conditioning assembly 20 may include a liner (not shown), such as, internal insulation, along the internal surface of the sidewall 30 so that the passage 32 is defined by the liner. Similarly, the external surface of the sidewall 30 may be covered by an external liner (not shown), such as, external insulation.

With reference specifically to FIG. 3, given the direction of the fluid flow 34, the end 36 defines an inlet 40 of the fluid conditioning device 26, and the end 38 defines an outlet 42 of the fluid conditioning device 26. Therefore, during operation of the duct system 10, fluid enters the inlet 40 of the fluid conditioning device 26, is conditioned by the control element 28, and then exits the fluid conditioning device 26 at the outlet 42 to pass through downstream components, such as, the duct section 14, elbow 18, and the duct section 16 of the duct system 10. While the inlet 40 and the outlet 42 are shown and described in a particular orientation shown in FIG. 1, this orientation is merely exemplary. It will be appreciated that the inlet 40 and the outlet 42 may be reversed from that shown and may depend upon the specific type of fluid conditioning device 26 and the type of duct system 10. As such, embodiments of the present invention are not limited to the specific direction of the flow of fluid as indicated in FIGS. 1 and 3.

As shown in FIG. 3, each of the opposing ends 36, 38 includes radially outwardly directed flanges 48 and 50, respectively. In one embodiment, one or both of the radially outwardly directed flanges 48, 50 are integrally formed with the sidewall 30 so that the flanges 48, 50 and sidewall 30 are formed as a one piece unitary structure. In this regard, the flanges 48, 50 may be formed of or turned on the sidewall 30 from a single continuous piece of material, typically metal, such as stainless steel. Integral formation of the flanges 48, 50 specifically excludes a separate angular ring that is welded or is otherwise joined to the sidewall 30, such as by fasteners or any other coupling method known in the art. As such, in one embodiment, fluid flow through the fluid conditioning assembly 20 is not exposed to a weld joint. Integrally forming the flanges 48, 50 may be achieved by one or more of the methods disclosed in U.S. Pat. No. 7,997,112; U.S. Publication No. 2009/0083962; and U.S. Publication No. 2010/0038902, which are assigned to the assignee of the present invention and are incorporated by reference herein in their entireties. Alternatively, the flanges 48, 50 may be formed with a van stone machine as will be appreciated by those of ordinary skill in the art. Advantageously, the integral flanges 48 and 50 may provide a contaminant-free assembly for use in food processing, pharmaceutical, and other industries requiring fluid flow of highly consistent, high quality fluid.

Figure 2:
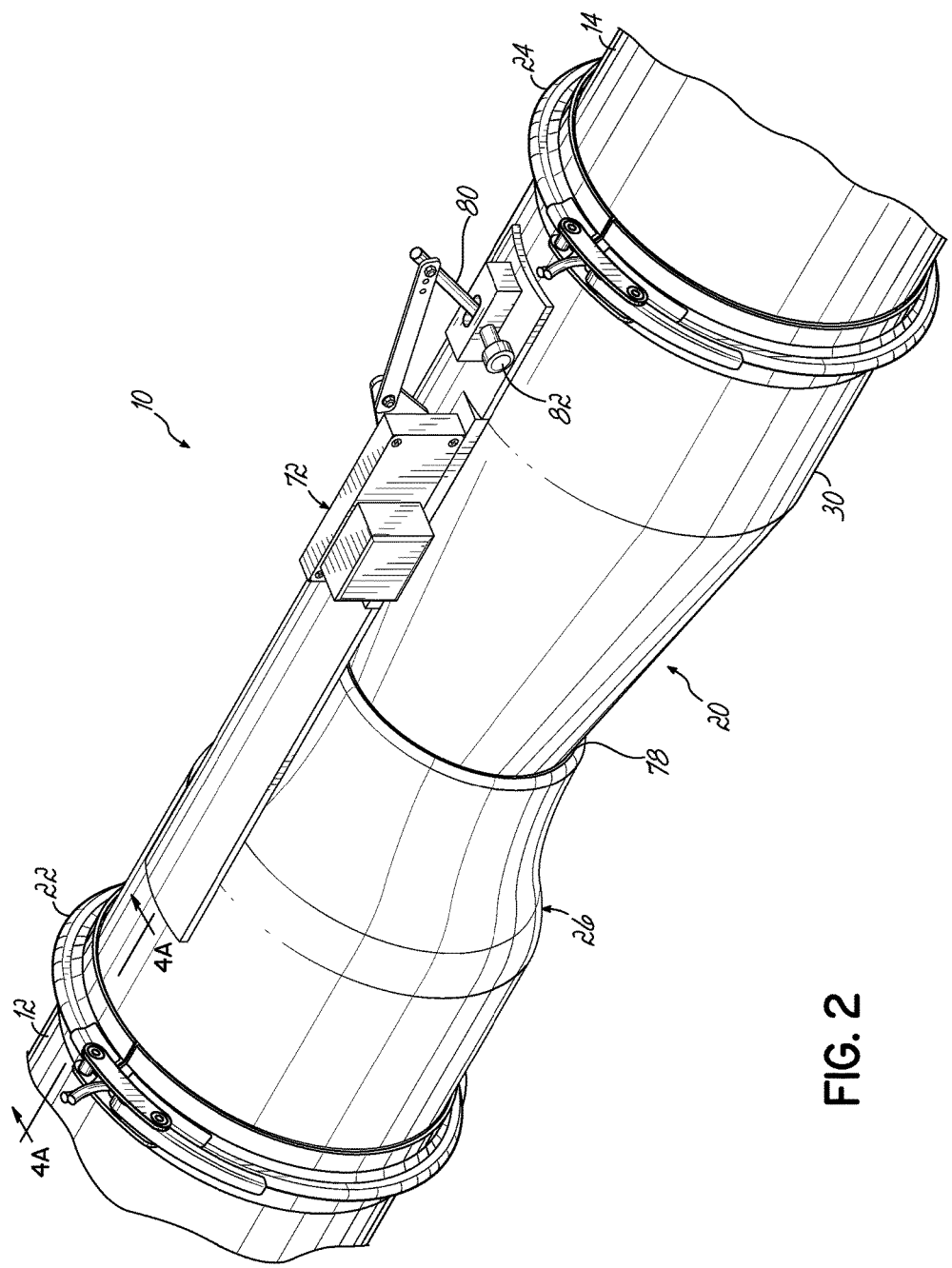
FIG. 2 is a perspective view of a portion of the ventilation duct system of FIG. 1 according to one embodiment of the present invention.
Figure 4A:
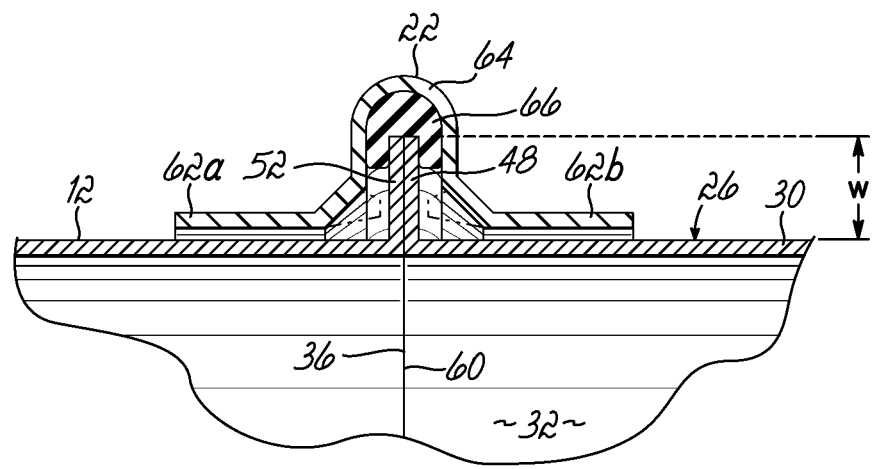
FIG. 4A is a cross-sectional view of the embodiment shown in FIG. 2 taken along section line 4A-4A.

Referring to FIG. 4A, in the embodiment shown, the duct section 12 has a radially outwardly directed flange 52 at an end 60. The flange 48 of the fluid conditioning device 26 may be operatively coupled to the flange 52 in a direct abutting relationship. When the flanges 48 and 52 are operatively coupled together, the duct section 12 may fluidly communicate with the fluid conditioning device 26. The clamp 22 may cooperate with the flanges 48 and 52 to releasably couple the fluid conditioning device 26 to the duct section 12. In the embodiment shown, at the joint between the fluid conditioning device 26 and the duct section 12, the end 36 of the fluid conditioning device 26 may directly abut the end 60 of the duct section 12. By way of example only, when the fluid conditioning device 26 is in an installed position as is shown in FIG. 2, an outwardly facing surface of the flange 48 may be in direct contact with an outwardly facing surface of the flange 52 of the duct section 12. The clamp 22 may engage each of the flanges 48 and 52 so as to releasably and operatively couple the fluid conditioning device 26 to the duct section 12.

To that end, the clamp 22 may include clamp legs 62a, 62b and a loop portion 64 formed between and joining clamp legs 62a, 62b. The clamp 22 may also include a gasket member 66 positioned proximate the loop portion 64. The gasket member 66 may span the interface between the flange 48 and the flange 52 to inhibit or prevent travel of fluid inwardly or outwardly through any gap that may exist between the flange 48 and the flange 52. The clamp 22 may prevent unintentional separation of the flange 48 from the flange 52 to thereby form a fluid-tight seal between the fluid conditioning device 26 and the duct section 12.

In one embodiment, and with continued reference to FIG. 4A, at the end 36 of the fluid conditioning device 26, the width, W, of the integral flange 48 may be less than the width of a flange that is configured to be bolted to an adjacent duct section. It will be appreciated that bolting through a flange requires a minimum flange width. That minimum width must be sufficient to allow clearance between the bolt head and the sidewall of the device so that a tool may be used to rotate the bolt to secure adjacent flanges together. And, that minimum width must also provide a minimum of material between the bolt hole and exterior-most edge of the flange to provide a mechanically sound flange. By way of example only, the flange width, W, of the integral flange 48 is less than about 1 inch. By way of additional example, W may be from about ⅛ inch to about ½ inch or from about 5/16 inch to about 7/16 inch. Advantageously, the integral flange allows the fluid conditioning assembly 20 to be removably and operatively coupled to the ductwork, though bolts may not be used.

Figure 4B:
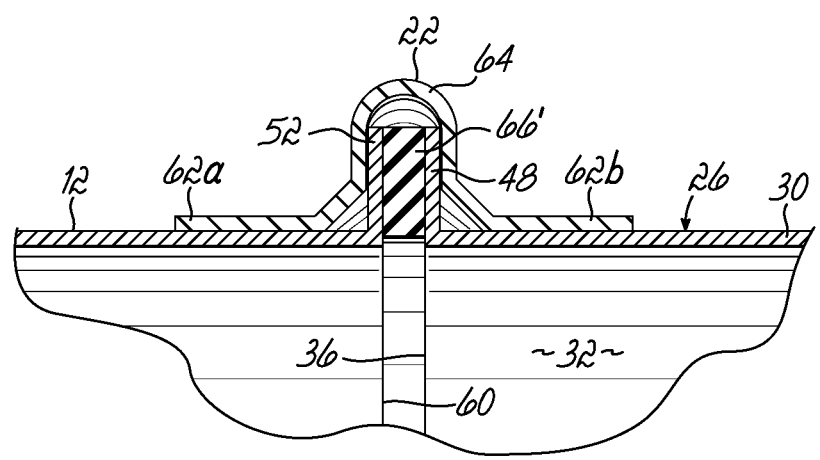
FIG. 4B is a cross-sectional view of an alternative embodiment of the joint shown in FIG. 4A.

In an alternative embodiment of the clamp 22, shown in FIG. 4B, the flange 48 and the flange 52 are separated by a gasket member 66'. In this configuration, the flange 48 and the flange 52 do not abut one another. Rather, the flanges 48, 52 sandwich a gasket member 66' therebetween. The clamp legs 62a, 62b may engage the opposing surfaces of the flanges 48 and 52 to operatively couple the duct section 12 and the fluid conditioning device 26. The clamp 22 may prevent unintentional separation of the flange 48 from gasket member 66' and also prevent unintentional separation of the flange 52 from the gasket member 66' so as to provide a fluid-tight seal between the duct section 12 and the fluid conditioning device 26.

At the other end of the fluid conditioning device 26, i.e., at end 38, and with reference once again to FIG. 3, the clamp 24 may couple the fluid conditioning device 26 to the duct section 14. In this regard, the duct section 14 may be provided with the radially outwardly directed flange 54. The flange 50 of the fluid conditioning device 26 may align with the flange 54 of the duct section 14 so that the fluid exiting the fluid conditioning device 26 at the outlet 42 flows into the duct section 14. The clamp 24 may cooperate with each of the flanges 50 and 54 to releasably couple the fluid conditioning device 26 to the duct section 14. It will be appreciated that the clamp 24 may be similar to the clamp 22, as described above and shown in FIGS. 4A and 4B, however, embodiments of the present invention are not limited to the clamps 22, 24 being similar to one another. Clamps, such as clamps 22 and 24, are disclosed in commonly owned U.S. Pat. No. 7,997,112; U.S. Publication No. 2009/0083962; and U.S. Publication No. 2010/0038902, as set forth above.

Further in this regard, while the embodiments disclosed herein describe the clamps 22 and 24 as coupling the fluid conditioning device 26 and corresponding duct sections 12, 14 together, it will be appreciated that other clamps capable of coupling these components together may be used in accordance with embodiments of the present invention disclosed herein. By way of example only, and not limitation, clamps 22 and 24 may be a drawband clamp (FIG. 11), a companion-type clamp (FIG. 12), and a barrel clamp (not shown). It will be appreciated that use of these clamps, however, may be limited to certain applications.

With reference to FIG. 3, the flanges 52 and 54 of the duct sections 12 and 14, respectively, may be integral with the corresponding duct section. That is, the corresponding flange and the duct section may be formed from a single continuous piece of material with the respective duct section 12, 14. However, embodiments of the present invention are not limited thereto as one or both of the flanges 52, 54 may be provided by welding or bolting an annular ring onto the end of the respective duct section. This may be the case where existing duct work is modified to include the fluid conditioning assembly 20 has disclosed herein. In this regard, and by way of example only, and not limitation, such a modification may include cutting and/or removing a section from a duct run, adding flanges 52 and 54 to the cut ends of the spaced-apart duct sections, inserting the fluid conditioning assembly 20 within the space provided, and operatively and releasably coupling the fluid conditioning assembly 20 at each end 36, 38 of the corresponding duct sections with clamps 22, 24.

As set forth above, according to embodiments disclosed herein, the fluid conditioning assembly 20 may be removably coupled to the duct sections 12 and 14. Removing the fluid conditioning assembly 20 from between the spaced apart duct sections 12 and 14 allows a technician to access internal components of the fluid conditioning device 26. As introduced above, these internal components may include the control element 28; however, the fluid conditioning device 26 may have additional components.

In this regard, as shown in FIG. 1, an exemplary fluid conditioning device 26 is a venturi valve 70 having a control element 28 in the configuration of a cone that may be moved by an actuator 72 along a longitudinal axis 74 relative to a throat 78. It is known that by movement of the cone control element 28, a relatively constant flow of fluid may be achieved, though the static pressure in the duct section 12 may change. Thus, the venturi valve 70 may provide a relatively constant volume of fluid in the downstream portion of the duct system 10, such as in the duct section 14, the elbow 18, and the duct section 16.

To that end, a control arm 80 may be coupled to the actuator 72 and may pivot around a fulcrum 82 to axially move a control rod 84 slidably secured within the sidewall 30 by support spokes 86 (shown in FIG. 3) and bearing 88. The control rod 84 is attached to the cone control element 28. Each of these internal components may require inspection, maintenance and/or, repair, including replacement in the event of operational failure. Thus, according to the exemplary embodiment of the invention, the venturi valve 70 may be easily disconnected from each of the duct sections 12 and 14 and removed for inspection, maintenance, and/or repair. Other exemplary fluid conditioning devices that include control elements may include inline fans (FIG. 10), automatic dampers (FIG. 11), or manual dampers (FIG. 12) though the embodiments of the present invention are not limited to these specific devices.

Once removed, a technician may adjust, maintain, or replace any of the internal components, such as, the cone control element 28, the control arm 80, or the control rod 84. The technician may also easily remove any foreign objects that have become stuck in the venturi valve 70, for instance, between the control element 28 and the throat 78.

Specifically, in the embodiment shown, and with reference to FIGS. 1-3, the clamps 22 and 24 may be disengaged from the corresponding flanges 48, 52 and 50, 54 between the venturi valve 70 and the adjacent duct sections 12 and 14 to release the venturi valve 70. The venturi valve 70 may be removed from between the duct sections 12 and 14. Advantageously, removal of a portion of the fluid conditioning assembly 20, such as the venturi valve 70, may be achieved without significant expenditure of effort and without damage to fluid conditioning assembly 20 or duct sections 12, 14.

In addition, according to embodiments of the present invention, reassembly of the venturi valve 70 following inspection, maintenance and/or repair, to obtain a fluid-tight seal between the venturi valve 70 and the duct section 12 and between the venturi valve 70 and the duct section 14 may be easily achieved. Specifically, in this regard, the venturi valve 70 may be positioned between the spaced apart ends of the duct section 12 and the duct section 14. The respective flanges 48, 52 and 50, 54 may be aligned and then the clamps 22 and 24 may be engaged with the respective flanges to operatively couple the duct sections 12, 14 and the venturi valve 70.

Figure 5:
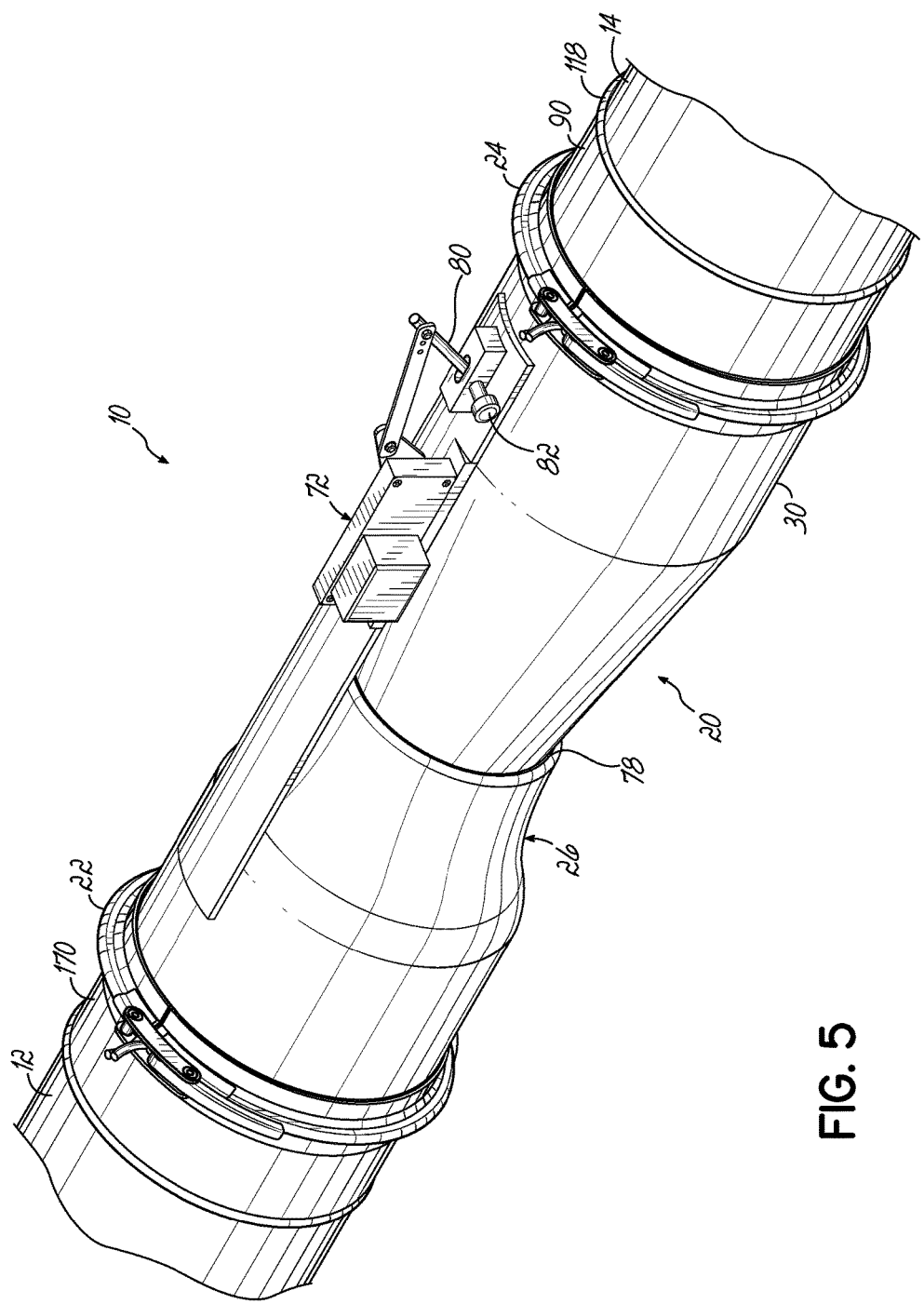
FIG. 5 is a perspective view of a portion of a ventilation duct system according to another embodiment of the present invention.
Figure 6:
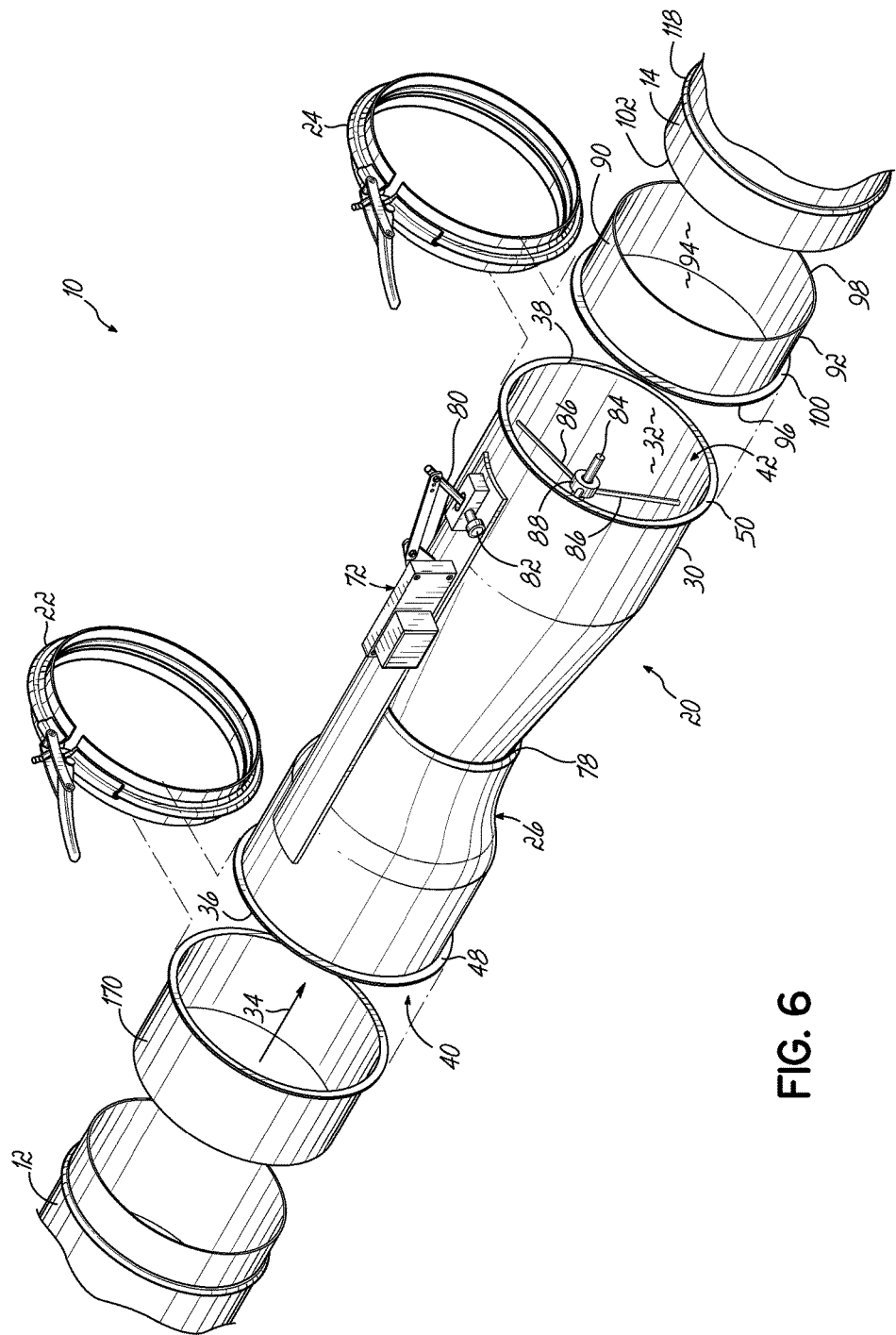
FIG. 6 is an exploded perspective view of the embodiment shown in FIG. 5.

With reference now to FIGS. 5 and 6, in another embodiment of the present invention, the fluid conditioning assembly 20 may include the fluid conditioning device 26, as set forth above, and may further include one or more adapters 90 for operatively coupling the fluid conditioning device 26 to one or both of the duct sections 12 and 14. While FIGS. 5 and 6 depict adapters at each end of the fluid conditioning device 26, it will be appreciated that embodiments of the invention may include a single adapter at one end of the device 26.

In one embodiment, the adapter 90 may resemble a short section of duct having a radially outwardly directed flange at one end thereof. The adapter 90 may have a tubular configuration, for example, with a circular cross-section. It will be appreciated, however, that the adapter 90 is not limited to cylindrical shapes as other cross-sectional shapes are contemplated, for example, rectangular or oval cross-sectional shapes. Furthermore, the adapter 90 may be configured to operatively couple a duct section of one cross-sectional configuration to the fluid conditioning device 26 of another cross-sectional configuration. By way of example only, the adapter 90 may transition from round to rectangular cross-sectional configurations. Specifically, for example, where the duct section has a rectangular cross-section and the fluid conditioning device 26 has a circular cross-section, the adapter 90 may be configured with a similar rectangular cross-section to the duct section at one end and may be configured with a circular cross-section at the opposing end. The reverse configuration is also possible.

With reference to FIG. 6, the adapter 90 includes a sidewall 92 that defines a passage 94. The sidewall 92 has ends 96 and 98. At least one of the ends 96 and 98 has a radially outwardly directed flange 100. The other end 98 is configured to be coupled to the duct section 14, as set forth below. As set forth above with respect to the flanges 48 and 50 of the fluid conditioning device 26, the radially outwardly directed flange 100 may be integrally formed with a sidewall 92. The same methods disclosed above with regard to integrally forming flanges may be used to integrally form flange 100. Thus, in one embodiment, the adapter 90 is free of weld seams that are exposed to the fluid flow within passage 94. Further in this regard, fluid flow through the fluid conditioning assembly 20 is not exposed to welds at the joints between the fluid conditioning assembly 20 and the duct sections 12 and 14.

When the adapter 90 is coupled to the duct section 14, the flange 100 is available to be aligned with and operatively coupled to the flange 50 of the fluid conditioning device 26 in a similar manner as that described above with respect to the flanges 48 and 52. When the flange 50 is aligned with the flange 100 of the adapter 90, the passage 94 is in fluid communication with the passage 32 of the fluid conditioning device 26. Thus, fluid exiting the fluid conditioning device 26 enters the adapter 90 and then may flow into the duct section 14.

Figure 7:
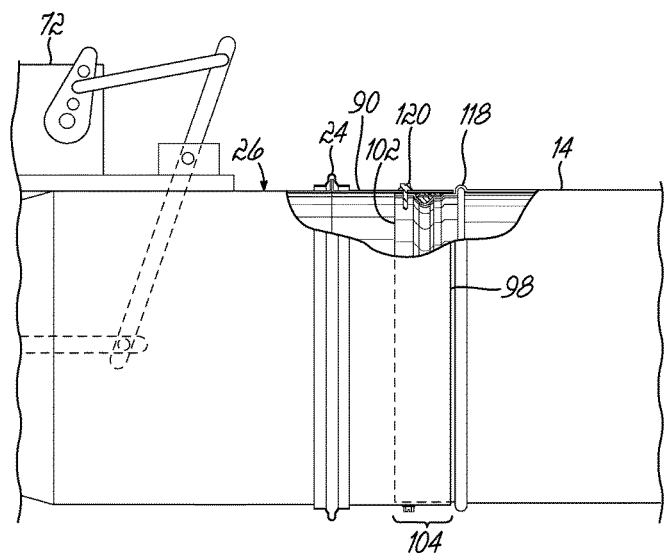
FIG. 7 is a partial cross-sectional view of the embodiment shown in FIG. 5.

With referenced now to FIGS. 6 and 7, in one exemplary embodiment, the adapter 90 may be operatively coupled to the duct section 14. In the embodiment shown in FIG. 7, the area proximate the end 98 of the adapter 90 is dimensioned so as to be slightly larger than an end 102 of the duct section 14. The adapter 90 may then be slipped or inserted over a portion of the duct section 14 including the end 102. In this configuration, there may be an area of overlap, designated 104 in FIG. 7, between the end 102 of the adapter 90 and the end 98 of the duct section 14. While the adapter 90 is shown as being slightly larger in dimension than the corresponding end portion in the area of overlap 104 of the duct section 14, it will be appreciated that the reverse configuration is equally applicable. In that regard, the end 98 of the adapter 90 may fit within and be surrounded by the duct section 14. Where necessary to prevent ingress or egress of fluid from or into the duct system 10 in either configuration, a commercially available sealant may be applied along the periphery of the end 98 between the adapter 90 and the duct section 14 or between the adapter 90 and the duct section 14 in the area of overlap 104.

Figure 7A:
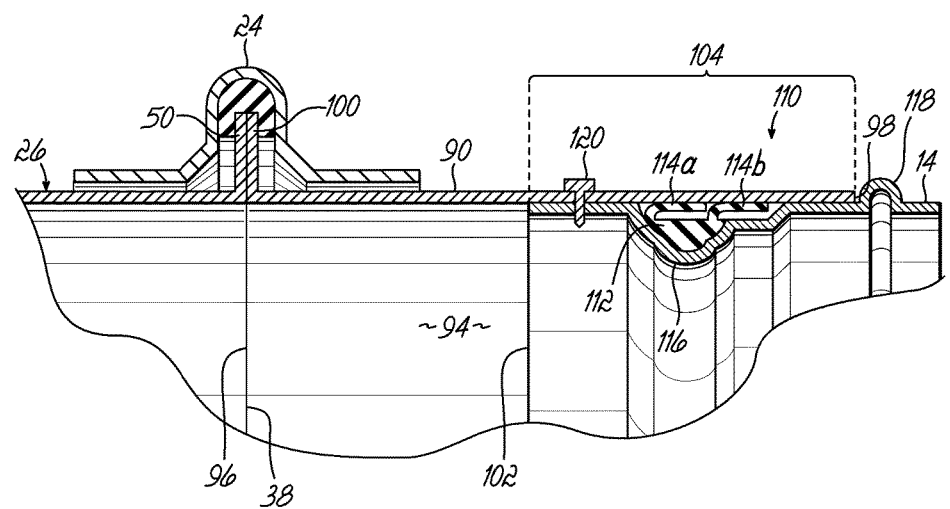
FIG. 7A is an enlarged view of the cross-sectioned area of FIG. 7.

In another embodiment of the invention and with reference to FIG. 7A, the duct section 14 may include a coupling portion 110 that includes a region of the duct section 14 proximate the end 102. The coupling portion 110 is configured to sealingly engage the adapter 90 in the overlap region 104. In this regard, a sealing gasket 112 is provided in the overlap region 104 to form a fluid-tight seal between the adapter 90 and the duct section 14. The sealing gasket 112 is configured as a double lip seal and may include a pair of annular sealing flanges 114a, 114b, for sealingly engagement with the passage 94 of the adapter 90. The sealing gasket 112 may be positioned in a radially inwardly extending bead 116. Exemplary gaskets suitable for use in embodiments of the present invention are disclosed in commonly owned U.S. Pat. No. 7,523,964; D534,253; and D529,598, which are assigned to the assignee of the present invention and are incorporated by reference herein in their entireties.

The coupling portion 110 may further include a radially outwardly directed annular bead 118 to provide a stop for the adapter 90 during installation thereof. In the installed position (shown in FIG. 7A), the adapter 90 may be slid over the coupling portion 110 to position the end 98 of the adapter 90 against the annular bead 118. A fastener 120, such as a sheet metal screw, may be used to secure the adapter 90 to the duct section 14 to prevent unintentional removal therefrom.

Figure 8:
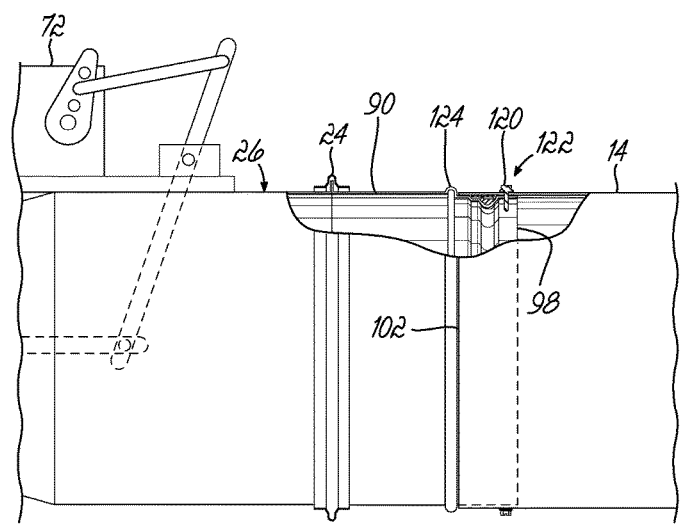
FIG. 8 is a partial cross-sectional view of another embodiment of the invention illustrating another embodiment of a joint.
Figure 8A:
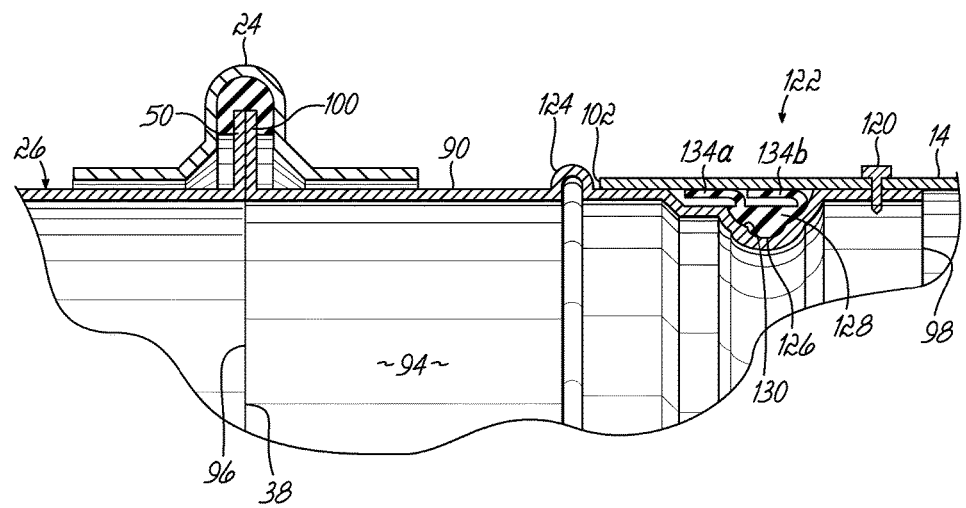
FIG. 8A is an enlarged view of the cross-sectioned area of FIG. 8.
Figure 8B:
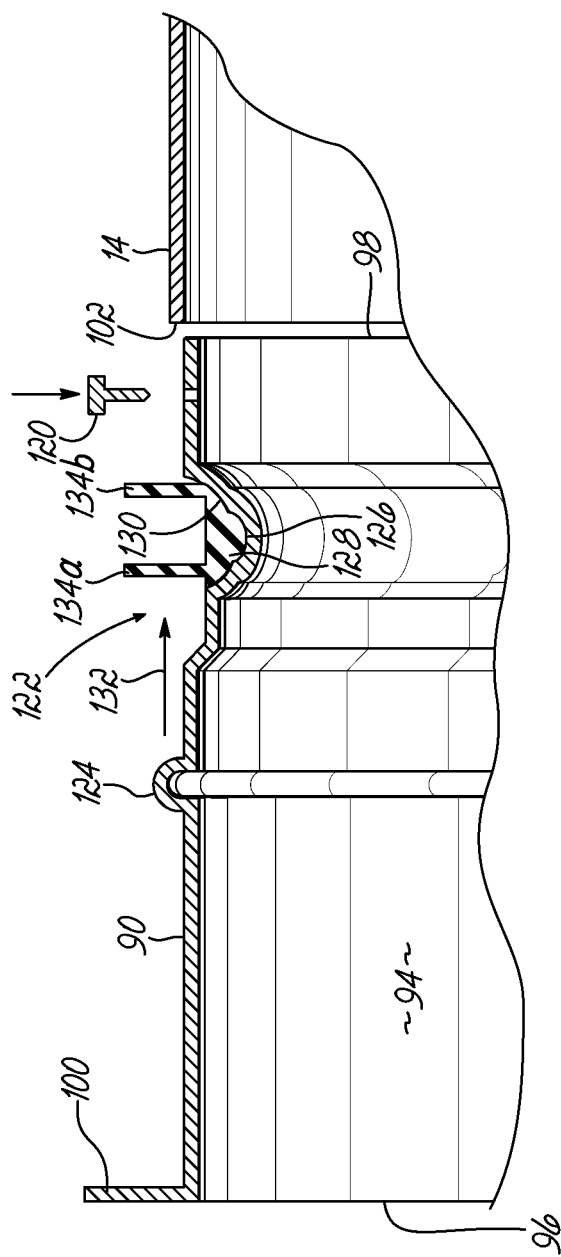
FIG. 8B is an enlarged disassembled cross-sectional view of FIG. 8 prior to assembly.

In another embodiment of the invention, as shown in FIGS. 8, 8A, and 8B, the adapter 90 may be provided with a coupling portion 122 similar to the coupling portion 110 of the duct section 14, set forth above with reference to FIGS. 7 and 7A. The coupling portion 122 may include an annular outwardly extending bead 124. In addition, the coupling portion 122 may include an annular inwardly extending bead 126 (see FIGS. 8A and 8B). A sealing gasket 128 may be positioned in a radiused bottom wall 130 defined by the annular inwardly extending bead 126.

With specific reference to FIG. 8B, the adapter 90 is depicted separately from the duct section 14. During insertion, as indicated by arrow 132, the adapter 90 may be moved axially relative to the duct section 14 so that the end 98 of the adapter 90 moves axially relative to the end 102 of the duct section 14 to bring a pair of annular sealing flanges 134a, 134b into engagement with the duct section 14. When the end 102 reaches the annular outwardly extending bead 124, a fastener 120 may be secured through both the adapter 90 and the duct section 14. Once the adapter 90 is installed, as shown in FIG. 8A, the fluid conditioning device 26 may be assembled so as to align the flange 50 with the flange 100. The clamp 24 may be brought into position to secure the fluid conditioning device 26 to the adapter 90 as shown in FIG. 8.

Figure 9:
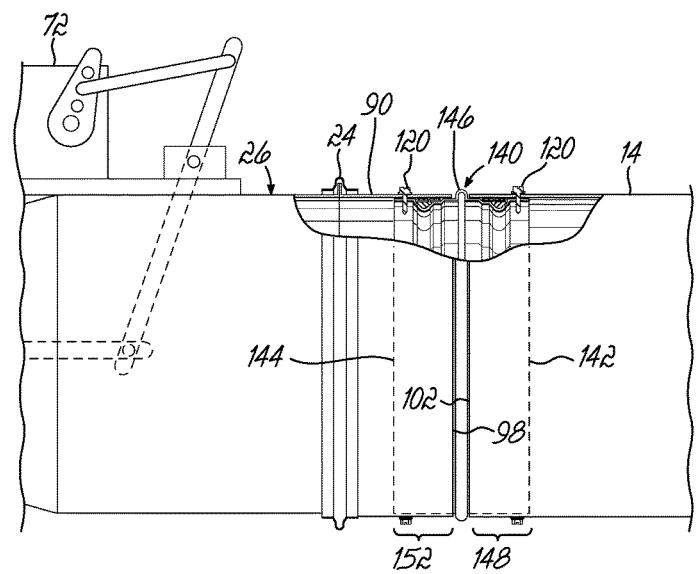
FIG. 9 is a partial cross-sectional view of another embodiment of the invention illustrating another embodiment of a joint.
Figure 9A:
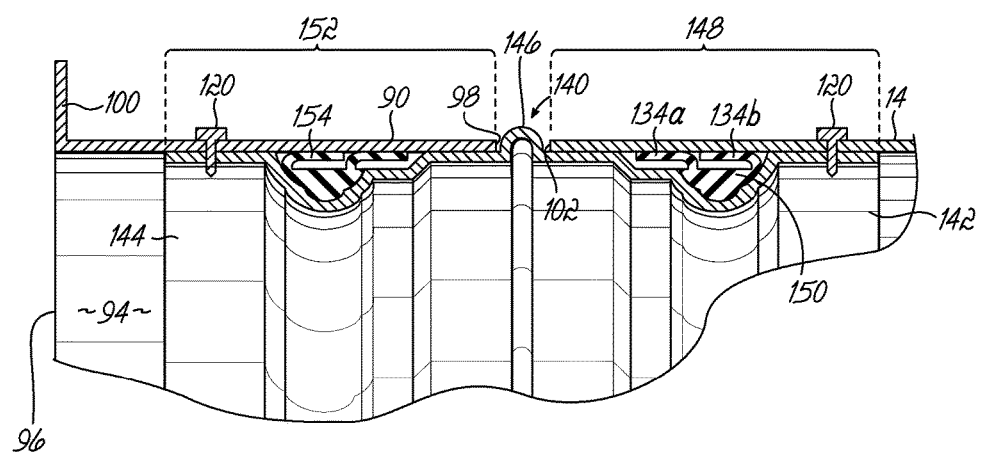
FIG. 9A is an enlarged view of the cross-sectioned area of FIG. 9.

In another embodiment of the invention and with reference to FIGS. 9 and 9A, the fluid conditioning assembly 20 may include a sleeve coupling 140 that may form an intermediate coupling between the duct section 14 and the adapter 90. In this embodiment, the sleeve coupling 140 may be first installed or inserted into the duct section 14. The adapter 90 may then be coupled to the sleeve coupling 140. It will be appreciated, however, that the adapter 90 and the sleeve coupling 140 may be preassembled before being operatively coupled to the duct section 14. An exemplary sleeve coupling 140 according to embodiments of the present invention is disclosed in U.S. Pat. No. 7,523,964, D529, 598; and D521,147, which are assigned to the assignee of the present application and are incorporated by reference herein in their entireties.

More specifically, and with reference to FIG. 9A, the sleeve coupling 140 may be in the configuration of a tubular metal sleeve having a pair of opposite connection ends 142, 144 which may be separated by an outwardly directed annular bead 146. The connection end 142 is configured to be inserted into the duct section 14 to position the end 102 of the duct section 14 proximate the annular bead 146. In this manner, an overlap region 148 is formed between the duct section 14 and the sleeve coupling 140. As shown, a sealing gasket 150, similar to gasket 128, may provide a fluid-tight seal between the sleeve coupling 140 and the duct section 14. Once the sleeve coupling 140 is inserted into the duct section 14, a fastener 120 may be used to secure the sleeve coupling 140 to the duct section 14.

With continued reference to FIG. 9A, on the other end of the sleeve coupling 140, the adapter 90 may cooperate with the connection end 144 to form an overlap region 152 between the sleeve coupling 140 and the adapter 90. The adapter 90 may be slid onto the sleeve coupling 140 so as to position the end 98 proximate the annular bead 146. A sealing gasket 154, similar to gaskets 128 and 150, may provide a fluid-tight seal between the sleeve coupling 140 and the adapter 90 in the overlap region 152. Once the adapter 90 is slid onto the sleeve coupling 140, a fastener 120 may be used to secure the adapter 90 to the sleeve coupling 140.

Once the adapter 90 is operatively coupled to the duct section 14 via the sleeve coupling 140, the fluid conditioning device 26 may be brought into a position to align the flange 50 with the flange 100 of the adapter 90. The clamp 24 may be used to secure the flange 50 to the flange 100 to thereby operatively couple the fluid conditioning device 26 to the duct section 14, as is set forth above.

Figure 10:
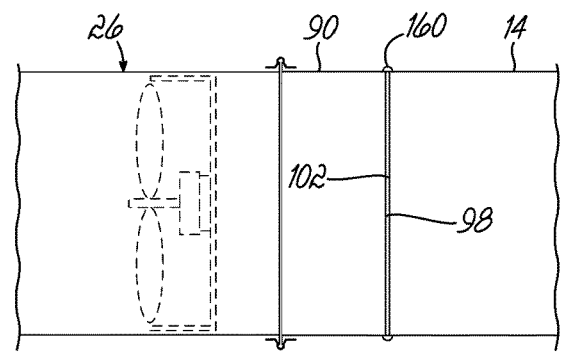
FIG. 10 is a side elevational view of another embodiment of the invention.

While various specific embodiments are disclosed for coupling the adapter 90 to the duct section 14, it will be appreciated that embodiments of the present invention are not limited to the specific embodiments. While the exemplary embodiment shown in FIGS. 7-9 illustrate the adapter 90 overlapping a portion of the duct section 14 or the sleeve coupling 140, the adapter 90 may be operatively coupled to the duct section 12 or 14 by abutting the end 98 of the adapter 90 to the end of the respective duct section 12 or 14, such as the end 102. For example, and with reference to FIGS. 10-12, it is contemplated that the adapter 90 may be operatively coupled to the duct section 14 by welding the end 98 of the adapter 90 to the end 102 of the duct section 14. As shown in FIG. 10, a weld bead 160 secures the adapter 90 to the duct section 14.

Figure 11:
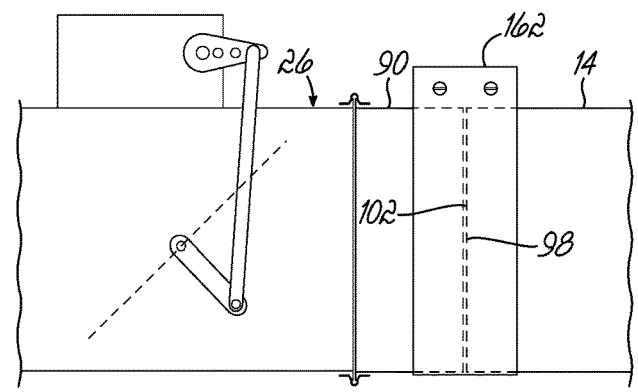
FIG. 11 is a side elevational view of another embodiment of the invention.

By way of further example and with reference to FIG. 11, a drawband 162 may be used to secure the adapter 90 to be duct section 14. In this regard, after bringing the end 98 of the adapter 90 proximate the end 102 of the duct section 14, the drawband 162 may be used to operatively couple the adapter 90 to the duct section 14.

Figure 12:
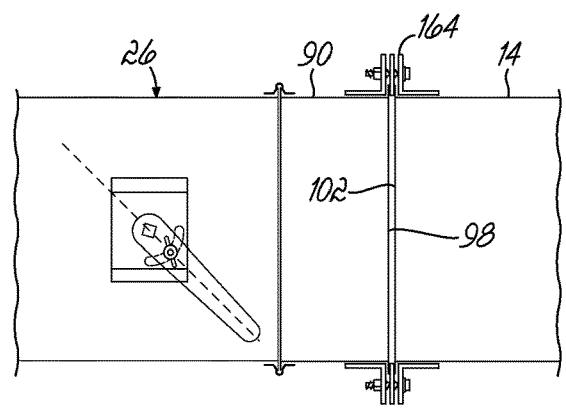
FIG. 12 is a side elevational view of another embodiment of the invention.

And, by way of yet another example, with reference to FIG. 12, the adapter 90 may be secured to the duct section 14 with a companion angle flange 164. The companion angle flange 164 may be riveted to the duct section 14 on one side and also riveted to the adapter 90 on the opposing side. It will be appreciated, however, the type of coupling between the duct sections 12 or 14 and the adapter 90 may depend upon the application for which the fluid conditioning assembly 20 is to be installed. In each of the FIGS. 10-12, the adapter 90 may be operatively coupled to the duct section 12 or 14 in a manner that does not expose fluid flow past this joint to contamination, such as, contamination from a weld.

With reference now to FIGS. 5 and 6, the fluid conditioning assembly 20 may include an adapter 170. The fluid conditioning device 26 may thus be coupled to the duct section 12 by the adapter 170. The adapter 170 may be similar in many respects to the adapter 90, described above with regard to coupling the fluid conditioning device 26 to the duct section 14. As such, the adapter 170 may be operatively coupled to the duct section 12 in a similar manner to that of the adapter 90, though embodiments of the present invention are not limited to the adapters 170 and 90 being operatively coupled to their respective duct sections 12 and 14 in a similar manner.

Furthermore, it is not necessary that the fluid conditioning device 26 be coupled to the duct section 12 with an adapter. In other words, the fluid conditioning device 26 may be coupled at one end to a duct section with an adapter, such as, the adapter 90 or the adapter 170. The opposing end of the fluid conditioning device 26, however, may be coupled to a duct section with a traditional transverse joint, such as, a plain "S" slip, a hemmed "S" slip, and a double "S" slip, to name only a few.

Figure 13:
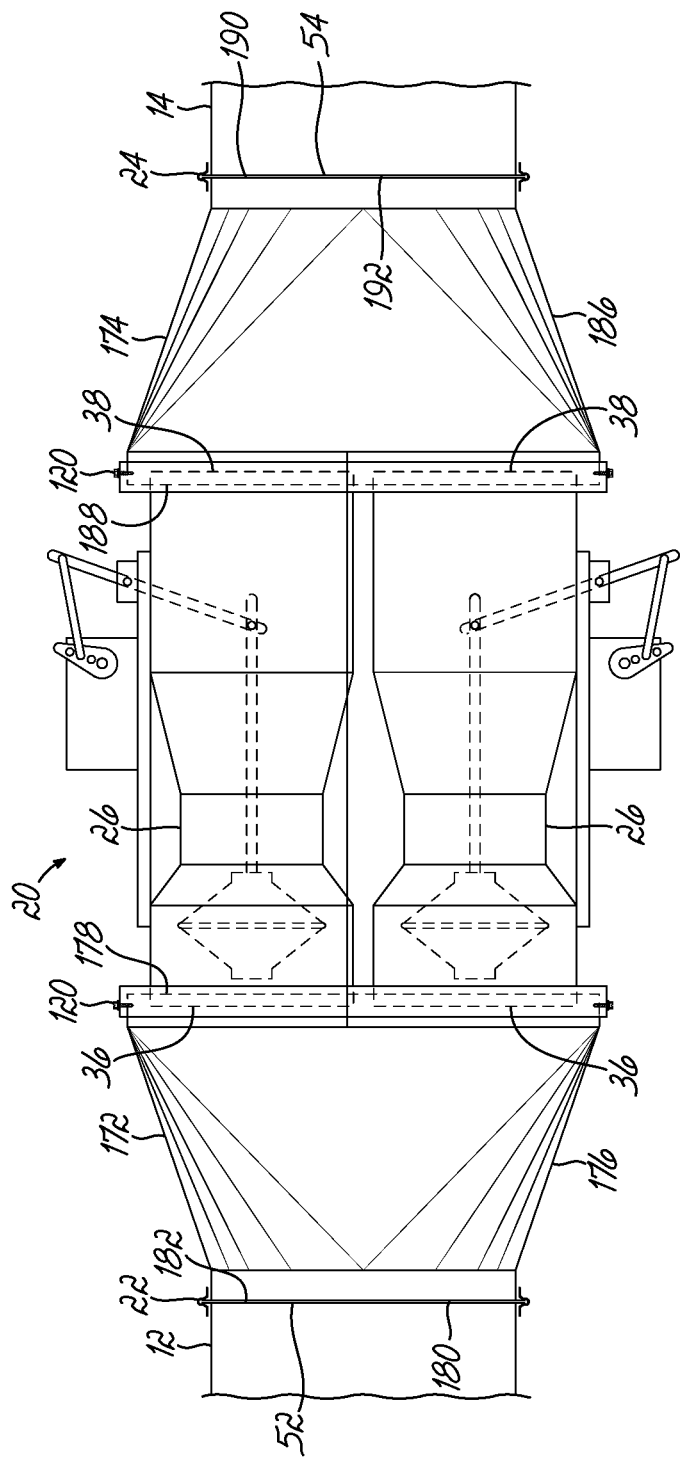
FIG. 13 is a side elevational view of another embodiment of the invention.

Further in this regard, and with reference to FIG. 13, in one embodiment of the invention, the fluid conditioning assembly 20 may include one or more fluid conditioning devices 26 operatively coupled to the duct section 12 and 14. As shown, this may include two fluid conditioning devices. In this regard, the fluid conditioning assembly 20 further includes fittings, such as, fittings 172 and 174, respectfully. As shown, the fluid conditioning devices 26 are arranged generally parallel to one another. The fittings 172, 174 may provide a transition at one or both ends 36 and 38 of each device 26 to the respective duct section 12, 14. While embodiments of the present invention are not limited to any particular cross-sectional configuration, the fittings 172, 174 may each be configured to transition from a circular cross-sectional configuration of the duct section 12 and duct section 14 at one end thereof to a rectangular cross-sectional configuration at the other end thereof. In this manner, one or more fluid conditioning devices 26 may be ganged together in a parallel configuration, as shown. This may be the case where the relative size difference between the duct sections 12, 14 and the fluid conditioning devices 26 requires multiple fluid conditioning devices to achieve the necessary changes in the fluid flow in the ventilation system 10. Furthermore, while two fluid conditioning devices 26 are shown, a single device or additional devices may be included in the assembly 20 and are within the scope of the present invention. For example, the fittings 172, 174 may transition from a duct section having a rectangular cross-sectional configuration to a single fluid conditioning device having a circular cross-sectional configuration.

More specifically, and with reference to FIG. 13, the fitting 172 includes a sidewall 176 defining a passage (not shown) and opposing ends 178 and 180. As shown, the end 36 of each fluid conditioning device 26 may be operatively coupled to the fitting 172 at end 178 at a transverse joint, as is known in the art. By way of example, this may include securing the fitting 172 to each of the fluid conditioning devices 26 with a plurality of fasteners 120 and a sealant (not shown), where required to form a fluid-tight joint.

A radially outwardly directed flange 182 may be provided at the end 180 of the fitting 172. The flange 182 may be integrally formed, as set forth above, and be positioned relative to the flange 52 of the duct section 12 to allow the fluid conditioning assembly 20 to be operatively coupled to the duct section 12. In one embodiment, the clamp 22 may be used to couple the flange 182 to the flange 52 similar to embodiments of the invention shown in at least FIGS. 2 and 5.

A similar joint may be formed between the fitting 174 and the end 38 of the fluid conditioning device 26, though embodiments of the present invention are not limited to coupling fittings 172, 174 to the fluid conditioning devices 26 in a similar manner. Specifically, the fitting 174 includes a sidewall 186 having opposing ends 188 and 190 and defining a passage (not shown). The end 188 may cooperate with the ends 38 of each of the fluid conditioning devices 26 to form a joint therebetween. This joint may be similar to the joint, described above, between the fluid conditioning devices 26 and the fitting 172.

Similar to the fitting 172, the end 190 may be provided with a radially outwardly directed flange 192 that is configured to cooperate with the flange 54 of the duct section 14. The clamp 24 may be used to releasably and operatively couple the fluid conditioning assembly 20 to the duct section 14 via the flanges 54 and 192 similar to embodiments of the invention shown in at least FIGS. 2 and 5.

While the present invention has been illustrated by description of various embodiments and while those embodiments have been described in considerable detail, it is not the intention of applicants to restrict or in any way limit the scope of the appended claims to such details. Additional advantages and modifications will readily appear to those skilled in the art. The invention in its broader aspects is therefore not limited to the specific details and illustrative examples shown and described. Accordingly, departures may be made from such details without departing from the spirit or scope of applicants' invention.

Having described the invention, what is claimed is:

1. A fluid conditioning assembly for use in a ventilation duct system including a first rigid duct section and a second rigid duct section, the first rigid duct section having an end that is spaced apart from an end of the second rigid duct section, at least one of the ends of the first rigid duct section and the second rigid duct section being provided with a first radially outwardly directed flange having a face that extends the entire length of the first radially outwardly directed flange, the fluid conditioning assembly comprising:
    a fluid conditioning device that has a sidewall defining a passage therethrough and having a first end and a second end, the first end including a first integral radially outwardly directed flange comprising a turned portion of the sidewall from a continuous piece of material and having a face that extends perpendicularly from the sidewall from an intersection of the integral radially outwardly directed flange with the sidewall and over the entire length of the first integral radially outwardly directed flange; and
    a control element supported within the passage between the first end and the second end and configured to condition a flow of fluid passing through the passage of the fluid conditioning device,
    wherein the first integral radially outwardly directed flange is configured to be operatively and releasably coupled to the first radially outwardly directed flange of the first rigid duct section or the second rigid duct section with the face of the first integral radially outwardly directed flange of the fluid conditioning device being parallel to the face of the first radially outwardly directed flange of the rigid duct section so that the fluid conditioning device is removable relative to the first rigid duct section to permit access to the control element when the fluid conditioning device is removed.

2. The fluid conditioning assembly of claim 1, further including:
    a first adapter configured to be removably coupled to one of the first rigid duct section and the second rigid duct section, the first adapter defining a passage therethrough and having a first end and a second end, the first end including the first radially outwardly directed flange and the second end being configured to be moved axially relative to and slid over or slid within one of the ends of the first rigid duct section and the second rigid duct section.

3. The fluid conditioning assembly of claim 2, wherein the second end of the first adapter is configured to abut one of the ends of the first rigid duct section and the second rigid duct section and be operatively coupled thereto.

4. The fluid conditioning assembly of claim 2, wherein the first adapter includes a gasket configured to sealingly engage one of the first rigid duct section or the second rigid duct section when the first adapter is operatively coupled thereto.

5. The fluid conditioning assembly of claim 2, wherein at least one of the first rigid duct section and the second rigid duct section includes a gasket proximate the end thereof and the first adapter is configured to sealing engage the gasket when the first adapter is operatively coupled to one of the first rigid duct section and the second rigid duct section.

6. The fluid conditioning assembly of claim 2, further including:
    a sleeve coupling defining a passage and having a first end, a second end, a first gasket proximate the first end, and a second gasket proximate the second end of the sleeve coupling, the sleeve being movable along an axis to a position in which the first gasket sealingly engages the first rigid duct section and the second gasket being configured to sealingly engage the first adapter when the first adapter is operatively coupled with the sleeve coupling.

7. The fluid conditioning assembly of claim 2, wherein the second end of the fluid conditioning device has a second integral radially outwardly directed flange and the fluid conditioning assembly further includes:
    a second adapter configured to be removably coupled to the second rigid duct section and defining a passage therethrough and having a first end and a second end, the first end of the second adapter having a second radially outwardly directed flange configured to be operatively and releasably coupled to the second integral radially outwardly directed flange of the fluid conditioning device so that the fluid conditioning device is removable relative to the second duct section to permit access to the control element when the fluid conditioning device is removed from between the first and second rigid duct sections and the second end configured to be moved axially relative to and slid over or slid within the other one of the ends of the first rigid duct section and the second rigid duct section.

8. The fluid conditioning assembly of claim 7, further comprising:
    a first clamp that cooperates with the first radially outwardly directed flange and the first integral radially outwardly directed flange, the first clamp being configured to releasably couple the fluid conditioning device to the first adapter; and
    a second clamp that cooperates with the second radially outwardly directed flange and the second integral radially outwardly directed flange, the second clamp being configured to releasably couple the fluid conditioning device to the second adapter.

9. The fluid conditioning assembly of claim 1, further including:
    a clamp that cooperates with the first radially outwardly directed flange and the first integral radially outwardly directed flange and is configured to releasably couple the fluid conditioning device to the first rigid duct section or the second rigid duct section.

10. The fluid conditioning assembly of claim 9, wherein the clamp further includes a gasket for sealingly engaging the first radially outwardly directed flange and the first integral radially outwardly directed flange.

11. The fluid conditioning assembly of claim 1, wherein the second rigid duct section is provided with a second radially outwardly directed flange, and wherein the second end of the fluid conditioning device includes a second integral radially outwardly directed flange, each of the first and second integral radially outwardly directed flanges of the fluid conditioning device is configured to be operatively and releasably coupled to the first and second radially outwardly directed flanges of the first rigid duct section and the second rigid duct section, respectively.

12. The fluid conditioning assembly of claim 11, further including:
a second clamp that cooperates with the second radially outwardly directed flange and the second integral radially outwardly directed flange of the fluid conditioning device and is configured to releasably couple the fluid conditioning device to the second rigid duct section.

13. The fluid conditioning assembly of claim 1, further including:
a fitting defining a passage therethrough and having a first end and a second end, one of the ends having the first integral radially outwardly directed flange and the other end being configured to be operatively coupled to the fluid conditioning device.

14. The fluid conditioning assembly of claim 1, wherein the fluid conditioning device is selected from the group consisting of a venturi valve, a damper, and a fan.

15. The fluid conditioning assembly of claim 1, wherein the second end of the fluid conditioning device has a second integral radially outwardly directed flange.

16. A ventilation duct system, comprising:
a first rigid duct section having an end provided with a first radially outwardly directed flange having a face that extends the entire length of the first radially outwardly directed flange;
a second rigid duct section spaced apart from the first rigid duct section and having an end provided with a second radially outwardly directed flange having a face that extends the entire length of the second radially outwardly directed flange;
a fluid conditioning assembly operatively coupling the end of the first rigid duct section to the end of the second rigid duct section, the fluid conditioning assembly comprising:
a fluid conditioning device that has a sidewall defining a passage and having a first end and a second end, the first end and second end each including an integral radially outwardly directed flange comprising a turned portion of the sidewall from a continuous piece of material and having a face that extends perpendicularly from the sidewall from an intersection of the integral radially outwardly directed flange with the sidewall and over the entire length of the integral radially outwardly directed flange; and
a control element in the passage and configured to condition a flow of fluid between the first rigid duct section and the second rigid duct section;
a first clamp releasably coupling the first radially outwardly directed flange of the first rigid duct section to one of the integral radially outwardly directed flanges whereby the face of the first radially outwardly directed flange is parallel to the face of one of the integral radially outwardly directed flanges; and
a second clamp releasably coupling the second radially outwardly directed flange of the second rigid duct section to the other of the integral radially outwardly directed flanges whereby the face of the second radially outwardly directed flange is parallel to the face of the other of the integral radially outwardly directed flanges,
wherein the fluid conditioning device is removable relative to the first rigid duct section and the second rigid duct section by releasing each of the first and second clamps to permit access to the control element when the fluid conditioning device is removed.

17. The ventilation duct system of claim 16, wherein the fluid conditioning device is selected from the group consisting of a venturi valve, a damper, and a fan.

18. The ventilation duct system of claim 16, further including:
an adapter defining a passage and having a first end and a second end, the first end having the first radially outwardly directed flange and the second end being removably coupled to the first rigid duct section and the second end being configured to be moved axially relative to and slid over or slid within the end of the first rigid duct section.

19. The ventilation duct system of claim 18, wherein the fluid conditioning assembly further includes:
a sleeve coupling defining a passage and having a first end, a second end, a first gasket proximate the first end of the sleeve coupling, and a second gasket proximate the second end of the sleeve coupling, the sleeve being movable along an axis to a position in which the first gasket sealingly engages the first rigid duct section and the second gasket being configured to sealingly engage the adapter when the adapter is operatively coupled with the sleeve coupling.

20. The ventilation duct system of claim 16, wherein the fluid conditioning assembly further includes:
a fitting configured to operatively couple the fluid conditioning assembly to the first rigid duct section and having a first end and a second end, one of the ends having the integral radially outwardly directed flange and the other end being configured to be operatively coupled to the fluid conditioning device.

* * * * *